US011921282B2

(12) United States Patent
Lin

(10) Patent No.: US 11,921,282 B2
(45) Date of Patent: Mar. 5, 2024

(54) COMPUTER SCREEN FILTER

(71) Applicant: SENSEAGE CO., LTD., New Taipei (TW)

(72) Inventor: Ben-Tien Lin, New Taipei (TW)

(73) Assignee: Senseage Co., Ltd., New Taipei (TW)

( * ) Notice: Subject to any disclaimer, the term of this patent is extended or adjusted under 35 U.S.C. 154(b) by 62 days.

(21) Appl. No.: 17/648,969

(22) Filed: Jan. 26, 2022

(65) Prior Publication Data

US 2023/0204939 A1    Jun. 29, 2023

(30) Foreign Application Priority Data

Dec. 22, 2021 (TW) ................................. 110215224

(51) Int. Cl.
  *G02B 26/00* (2006.01)
  *G02F 1/1335* (2006.01)
  *G06F 3/02* (2006.01)
  *H04N 9/73* (2023.01)

(52) U.S. Cl.
  CPC ..... *G02B 26/008* (2013.01); *G02F 1/133512* (2013.01); *H04N 9/73* (2013.01); *G06F 3/0227* (2013.01)

(58) Field of Classification Search
  None
  See application file for complete search history.

(56) References Cited

U.S. PATENT DOCUMENTS

| 2013/0162669 A1* | 6/2013 | Lauder ................... G09G 5/003 345/173 |
| 2018/0276418 A1* | 9/2018 | Li .......................... G02B 7/006 |
| 2021/0157360 A1* | 5/2021 | Gudsoe ................. G06F 1/1686 |

FOREIGN PATENT DOCUMENTS

| CN | 205682699 U | * | 11/2016 |
| CN | 206709700 U | * | 12/2017 |
| JP | H0530802 U | * | 4/1993 |

* cited by examiner

*Primary Examiner* — Shan Liu

(74) *Attorney, Agent, or Firm* — Rosenberg, Klein & Lee

(57) ABSTRACT

A computer screen filter includes an optical layer for changing the optical characteristic of a light emitted from a computer screen and a bonding mechanism layer, locally disposed on at least three sides of the optical layer. The optical layer is substantially in a rectangular shape and has two sides, and the bonding mechanism layer is disposed on a side of the optical layer, and the computer screen filter is only connected to a side of the computer screen by the bonding mechanism layer in a non-permanent fixation manner.

10 Claims, 5 Drawing Sheets

COMPUTER SCREEN FILTER

FIELD OF THE INVENTION

The present invention relates to the technical field of computer screens, and more particularly to a computer screen filter used for adjusting the optical performance of the display of a computer screen.

BACKGROUND OF THE INVENTION

In recent years, the demand and consumption of liquid crystal displays or light emitting diodes for display panels are increasing. In order to protect the health of users' eyes or achieve a certain optical effect (such as decreasing the viewing angle), an appropriate filtering material is applied externally onto a display device. Both of the original display brightness and color performance are pre-set with optimal set values to achieve the optimized display effect. Once a user applies the external filtering material to the display device, the original optimized display effect will be destroyed, so that the user usually needs to manually adjust the parameter setting of the display device to restore the visual effect closet to the original optimal effect. In view of this problem, the present invention provides a computer screen filter to solve the problem of the prior art.

SUMMARY OF THE INVENTION

It is a primary objective of the present invention to provide a computer screen filter with a simple structural design that can avoid adverse optical influence on the display effect. In addition, the computer screen filter can also be matched with the display device, so that the display device can automatically detect the computer screen filter and adjust the display parameter to compensate the difference of the display effect for the computer screen filter.

To achieve the aforementioned and other objectives, the present invention discloses a computer screen filter including an optical layer for changing an optical characteristic of a light emitted from a computer screen, and a bonding mechanism layer locally disposed on at least three sides of the optical layer, wherein the optical layer is substantially in a rectangular shape and has two sides, and the bonding mechanism layer is disposed on a side of the optical layer, and the computer screen filter is only connected to a side of the computer screen by the bonding mechanism layer in a non-permanent fixation manner.

In some embodiments, the bonding mechanism layer is made of a ferromagnetic material of a non-permanent magnet. The bonding mechanism layer is continuously or non-continuously disposed on a side of the optical layer.

In some embodiments, the bonding mechanism layer is L-shaped and disposed at two corners of a side of the optical layer separately, and the optical layer can reduce a divergence angle of the passing light.

In some embodiments, the optical layer can partially absorbs a visible light with a wavelength of 400-500 nm emitted by the screen.

In some embodiments, the bonding mechanism layer further includes at least one permanent magnet installed in a display device and electrically connected to an electromagnetic flux detection device for detecting an electromagnetic field variation generated when the bonding mechanism layer is coupled with the at least one permanent magnet. The electromagnetic flux detection device determines the optical property of the optical layer by the electromagnetic field variation, and the display device adjusts a display parameter according to the optical property.

In some embodiments, the computer screen filter further includes a shielding layer disposed on the other side of the optical layer having the bonding mechanism layer. The shielding layer is in the same shape as that of the bonding mechanism layer.

DESCRIPTION OF THE PREFERRED EMBODIMENTS

To make it easier for people having ordinary skill in the art to understand the technical contents of the present invention, the specification accompanied by the drawings is described as follows.

In the present invention, the non-permanent fixation described in the present invention refers to the connection of two objects by magnetism, and such objects can be disconnected at any time.

With reference to FIGS. 1A-3 for the perspective view of a computer filter screen of the present invention and the schematic view of using the computer filter screen of the present invention respectively, the computer screen filter 1 includes an optical layer 10 for changing an optical characteristic of a light emitted from a computer screen, such as reducing the divergence angle of the light, reducing the intensity of the light, partially absorbing a part of wavelength of the light, etc. In some embodiments, the optical layer 10 has the polarizing effect or can reduce the reflection of the ambient light. The optical layer 10 is substantially a rectangular shape and has two sides. A side of the optical layer 10 has a bonding mechanism layer 20. In FIGS. 1A-3, the bonding mechanism layer 20 is partially disposed on at least three edges of a side of the optical layer. The computer screen filter 1 is only coupled with a side of the computer screen by the bonding mechanism layer 20 in a non-permanent fixation manner. As described above, the computer screen filter 1 is coupled by the bonding mechanism layer 20, and the two of some embodiments are coupled by ferromagnetism (also known as strong magnetism). In order to facilitate matching the bonding mechanism layer 20 with the permanent magnet of the computer screen or display device, the bonding mechanism layer 20 in some embodiments is made of a ferromagnetic material of a non-permanent magnet. Users can change the computer screen filter 1 of a computer screen with an optical layer 10 of different properties freely according to different requirements.

Figure 2:
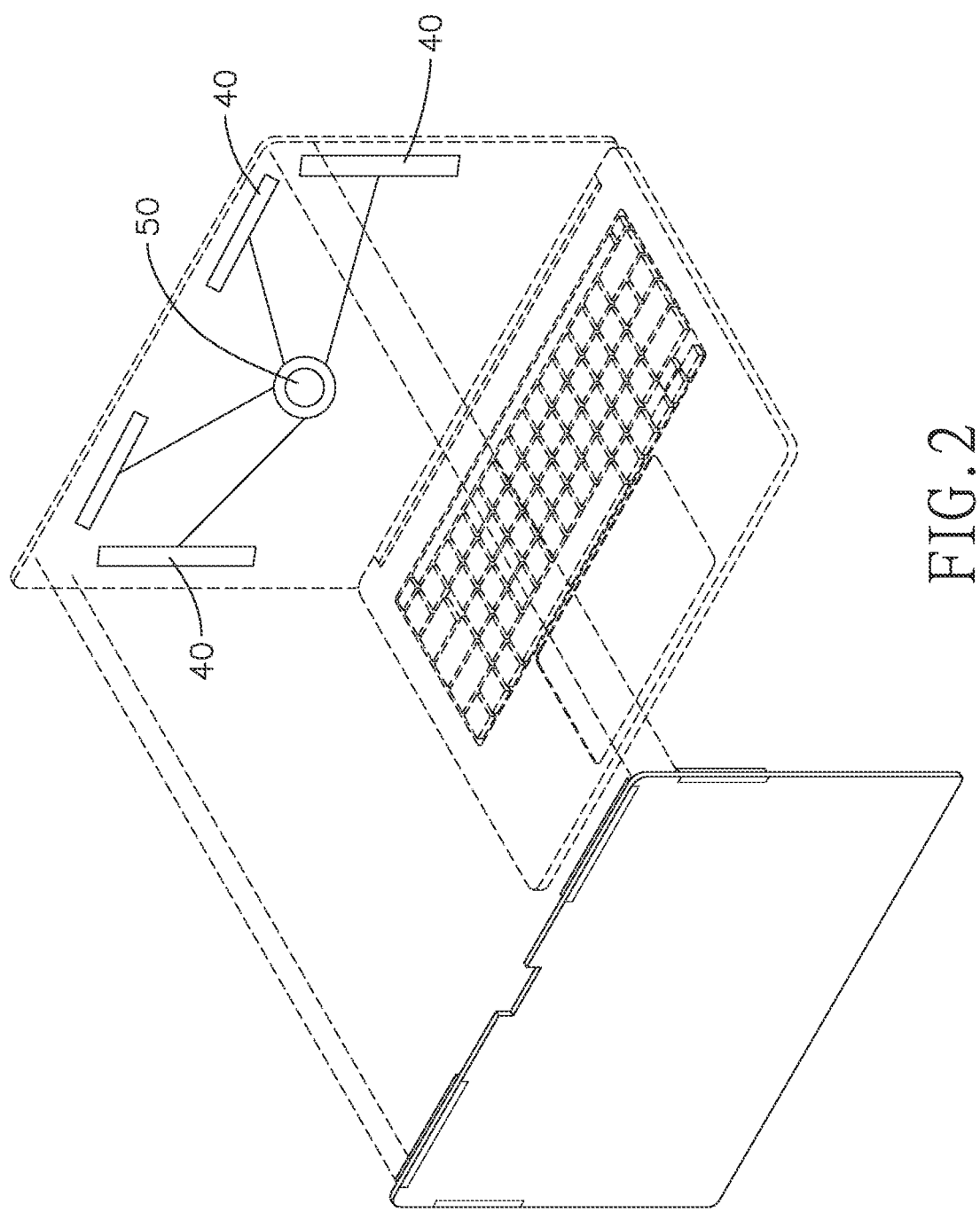
FIG. 2 is a schematic view of the first embodiment of the present invention.
Figure 3:
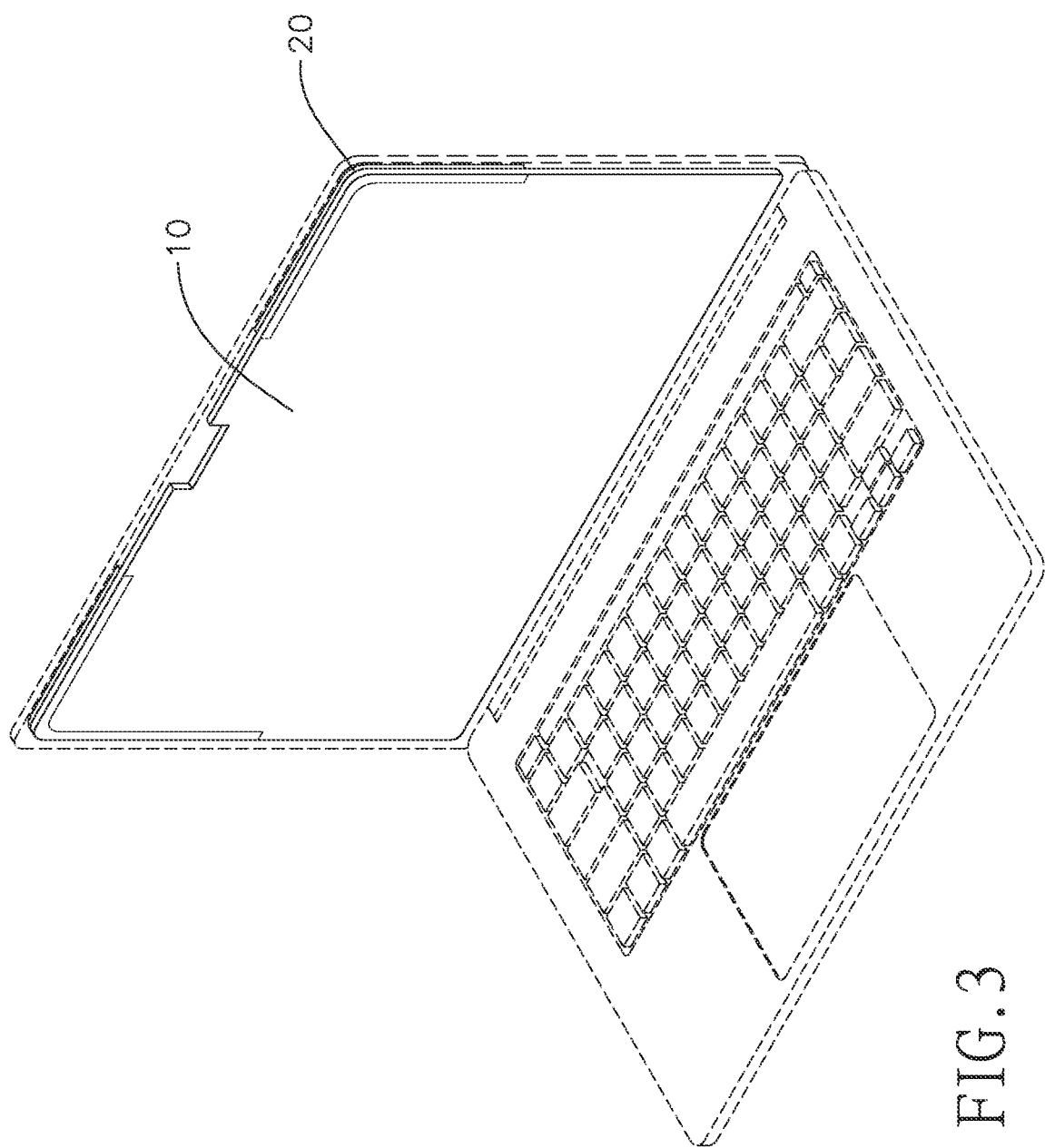
FIG. 3 is a schematic view showing a using status of the first embodiment of the present invention.

In FIG. 2, the computer screen or display device in some embodiments further includes at least one permanent magnet 40 and an electromagnetic flux detection device 50. The at least one permanent magnet 40 is electrically connected to the electromagnetic flux detection device 50 for detecting an electromagnetic field variation produced when the bonding mechanism layer 20 and the at least one permanent magnet 40 is coupled with each other. The electromagnetic flux detection device 50 uses the electromagnetic field variation to determine the optical property of the optical layer 10, and the display device adjusts a display parameter according to the optical property. In other words, each optical layer 10 of the present invention has a corresponding arrangement of the bonding mechanism layer 20. When a user couples a specific optical layer 10 having a bonding mechanism layer 20 with a different arrangement method to the computer screen or display device, the arrangement method of the bonding mechanism layer 20 will produce a specific electromagnetic field variation, and the electromagnetic flux detection device 50 can determine whether the optical layer 10 is a blue light filter layer, a polarization layer or an anti-glare layer for example by the electromagnetic field variation. Since each different optical layer 10 will cause a different influence to the screen and a different arrangement method of the bonding mechanism layer 20, the electromagnetic flux detection device 50 can adjust the screen display quality (including the brightness, the RGB light intensity, the overall light intensity of the light module, etc.) of the display device according to the influence caused by different optical layers 10 to compensate the adverse influence caused by the different optical layers 10. Therefore, the arrangement method of the bonding mechanism layer 20 can be regarded as an identification code provided for the electromagnetic flux detection device 50 to identify the functions of the optical layer 10 or the brand of the optical layer 10, thereby allowing users to make corresponding adjustments of the screen.

Figure 1A:
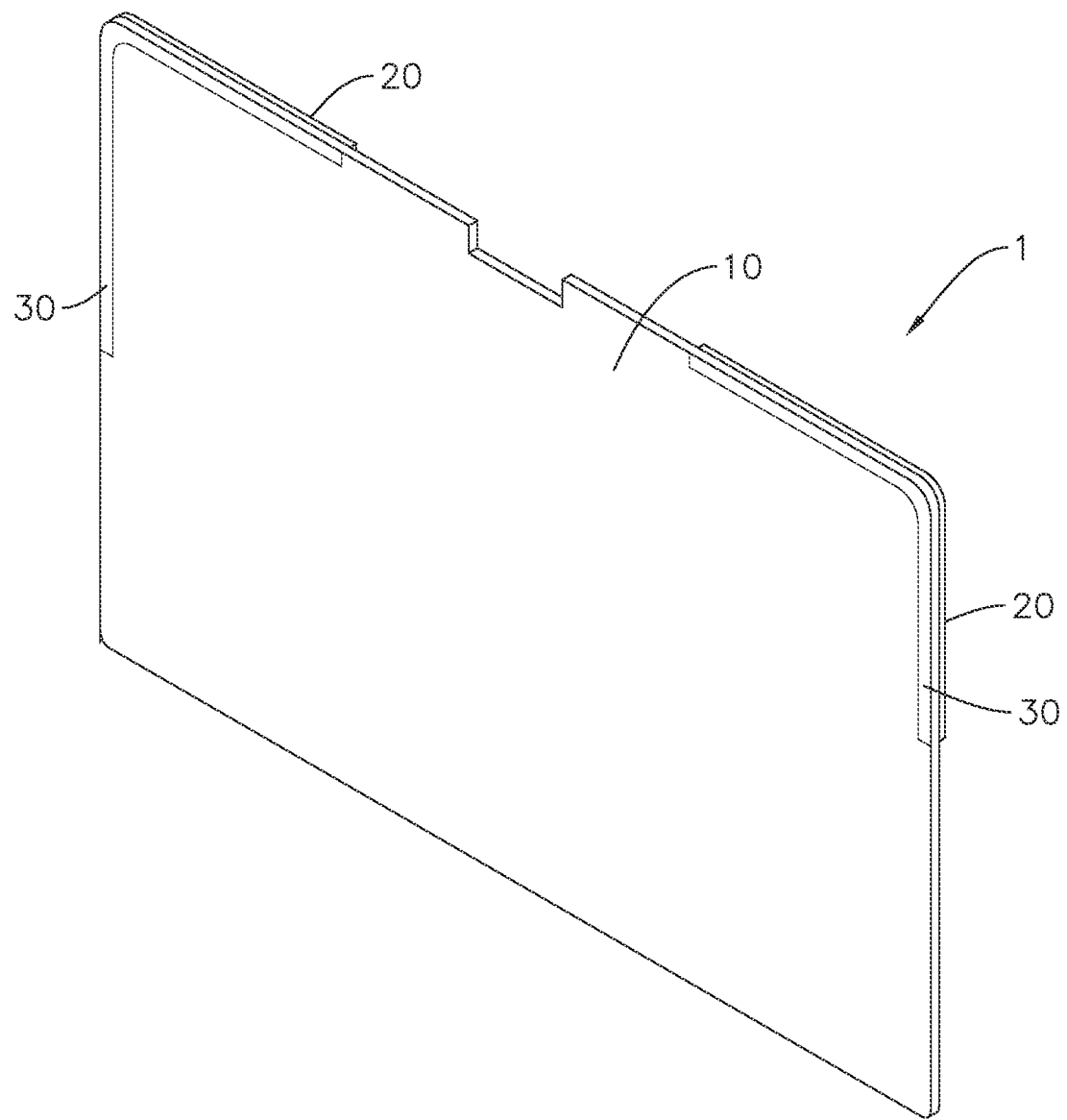
FIG. 1A is a perspective view of a first embodiment of the present invention.
Figure 1B:
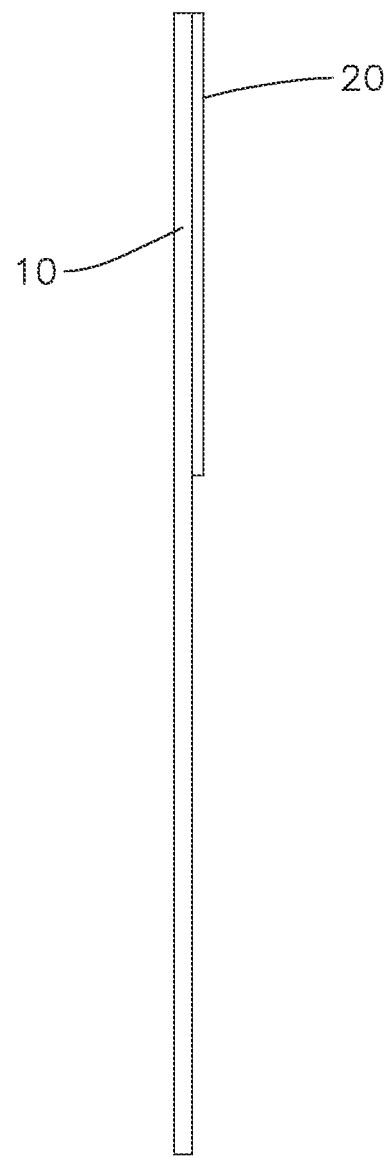
FIG. 1B is a side view of the first embodiment of the present invention.

In a specific embodiment as shown in FIGS. 1A-1B, when the bonding mechanism layer 20 is L-shaped, the optical layer 10 of the computer screen filter is a functional layer capable of reducing the divergence angle of the passing light. Therefore, the viewing angle of the screen produced by the computer screen or display device can be reduced significantly. In this embodiment, the L-shaped bonding mechanism layer 20 is continuously disposed on at least one side of the optical layer 10; particularly, the bonding mechanism layer 20 is disposed at two corners of a side of the optical layer 10 separately as shown in FIG. 1A, so that the bonding mechanism layer 20 is disposed at three edges of the optical layer 10. The electromagnetic flux detection device 50 can detect a specific magnetic flux generated by the L-shaped bonding mechanism layer 20, so that we can know about the optical property of the optical layer 10 capable of reducing the divergence angle of the passing light. In some embodiments, the electromagnetic flux detection device 50 is provided for adjusting the brightness of the display device according to the attributes of the display device. In this way, users will not feel the negative effect of the dimmed display brightness caused by the reduction of the viewing angle and the blocking of the light at some angles.

Figure 4:
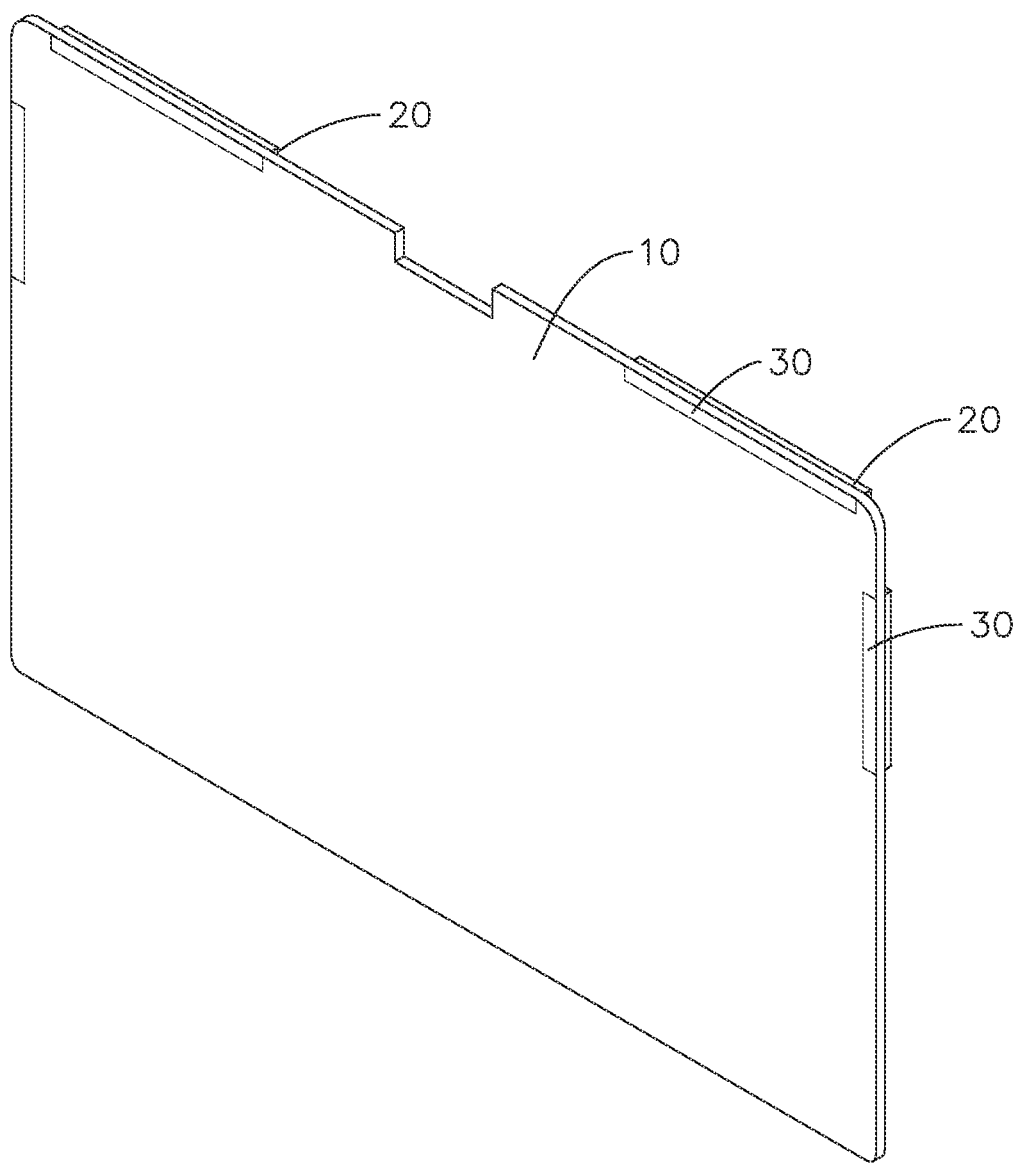
FIG. 4 is a perspective view of a second embodiment of the present invention.

In some embodiments as shown in FIG. 4, the optical layer 10 of the computer screen filter can be a functional layer (such as a blue light filter layer) capable of partially absorbing the visible light with a wavelength of 400-500 nm emitted from the screen. Therefore, damages to the users' eyes caused by the visible blue light generated by the computer screen or display device can be reduced. In this embodiment, the bonding mechanism layer 20 is non-continuously disposed at two corners of a side of the optical layer separately, and each bonding mechanism layer 20 has a gap apart from the other bonding mechanism layer 20. The electromagnetic flux detection device 50 can detect a specific magnetic flux generated by the non-continuously-disposed L-shaped bonding mechanism layer 20, so that we can know about the optical property of the optical layer 10 having the blue light filter function. In some embodiments, the electromagnetic flux detection device 50 is used to adjust the intensity of red light and green light of the computer screen or the display device according to the optical property. In this way, the negative effect of yellowing of the screen. It is noteworthy that the optical layer 10 of the present invention with the optical property capable of reducing the divergence angle of the passing light does not necessarily has the L-shaped bonding mechanism layer 20 and can also be arranged as a non-continuously-disposed L-shaped bonding mechanism layer 20, and vice versa.

In FIGS. 1A and 5, the computer screen filter 1 further includes a shielding layer 30 disposed on the other side of the optical layer 10 having the bonding mechanism layer 20. The shielding layer 30 is in the same shape as that of the bonding mechanism layer 20 for shielding the bonding mechanism layer 20. Therefore, the shielding layer 30 also has the effect of reducing the influence of external magnetism on the bonding mechanism layer 20, in addition to the aesthetic effect. In some embodiments (please refer to FIG. 1B), the shielding layer 30 has a thickness much smaller than those of the optical layer 10 and the bonding mechanism layer 20, so that the thickness of the shielding layer 30 as illustrated in the figure of this specification can be ignored.

In some embodiments, the bonding mechanism layer 20 is made of a black iron cloth material primarily containing iron, so that the bonding mechanism layer 20 can be magnetically attracted. In some embodiments, the magnet in the computer screen or display device includes 88-92 wt % (percentage by weight) of iron oxide powder and 8-12 wt % of chlorinated polyethylene.

While the present invention is described in some detail hereinbelow with reference to certain illustrated embodiments, it is to be understood that there is no intent to limit the invention to those embodiments. On the contrary, the aim is to cover all modifications, alternatives and equivalents falling within the spirit and scope of the invention as defined by the appended claims.

What is claimed is:
1. A computer screen filter, comprising:
an optical layer, for changing an optical characteristic of a light emitted from a computer screen, and the optical layer being substantially in a rectangular shape and having two sides; and
a bonding mechanism layer, locally disposed on three edges of the optical layer,
wherein the bonding mechanism layer is disposed on a side of the optical layer, and the computer screen filter is only coupled to a side of the computer screen by the bonding mechanism layer in a non-permanent fixation manner,
wherein the bonding mechanism layer is substantially L-shaped and disposed at only two corners of a side of the optical layer separately, and the optical layer is capable of reducing a divergence angle of the passing light, the bonding mechanism layer is non-continuously disposed on at least one side of the optical layer, and the optical layer partially absorbs a visible light with a wavelength of 400-500 nm emitted by the screen.
2. The computer screen filter of claim 1, wherein the bonding mechanism layer is made of a ferromagnetic material of a non-permanent magnet.

3. The computer screen filter of claim 1, further comprising at least one permanent magnet installed in a display device.

4. The computer screen filter of claim 3, wherein the at least one permanent magnet is electrically coupled to an electromagnetic flux detection device for detecting an electromagnetic field variation generated in case that the bonding mechanism layer is coupled with the at least one permanent magnet.

5. The computer screen filter of claim 4, wherein the electromagnetic flux detection device determines the optical property of the optical layer by the electromagnetic field variation, and the display device adjusts a display parameter according to the optical property.

6. The computer screen filter of claim 1, further comprising a shielding layer disposed on the other side of the optical layer having the bonding mechanism layer.

7. The computer screen filter of claim 6, wherein the shielding layer is in the same shape as that of the bonding mechanism layer.

8. The computer screen filter of claim 1, wherein the bonding mechanism layer is continuously disposed on at least one side of the optical layer.

9. The computer screen filter of claim 1, wherein the bonding mechanism layer is non-continuously disposed on at least one side of the optical layer.

10. The computer screen filter of claim 1, wherein the bonding mechanism layer is a black iron cloth containing iron.

\* \* \* \* \*